(No Model.)
R. NICOL, Jr.
BICYCLE CRANK AND PEDAL SHIELD.
No. 551,597.   Patented Dec. 17, 1895.
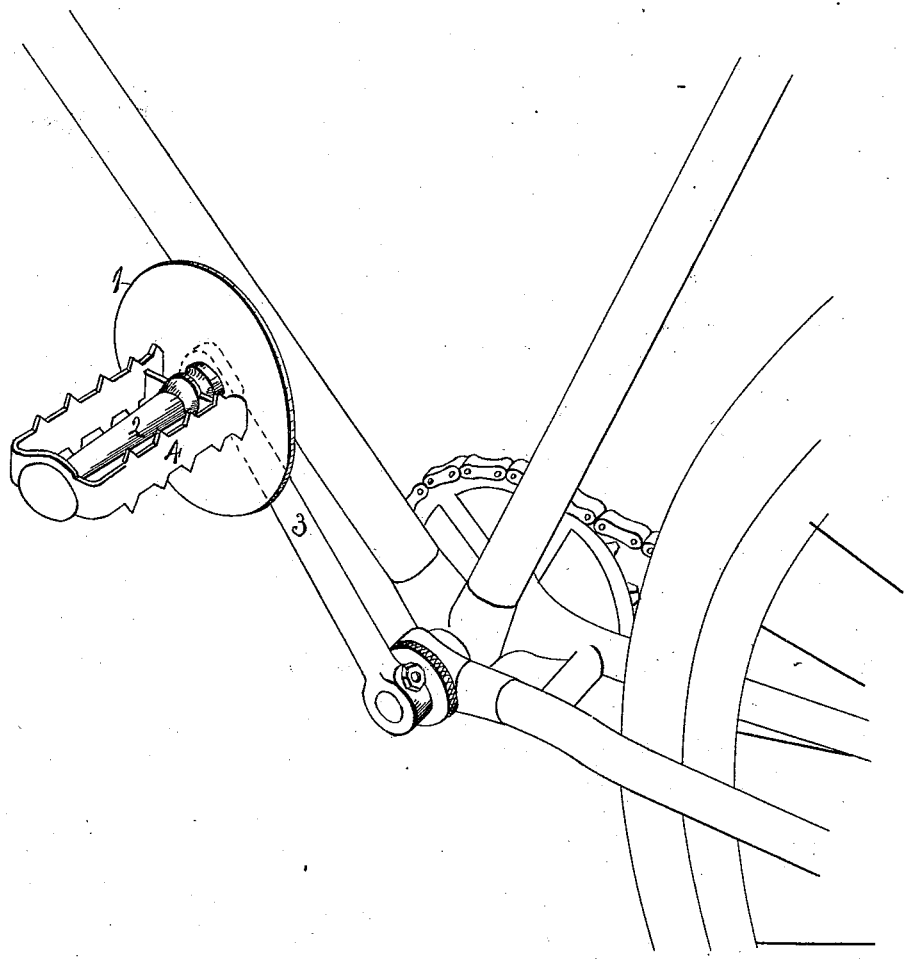
Witnesses:
F. Jackson
E. Behel.
Inventor:
Robert Nicol Jr
By A. O. Behel
Atty.

UNITED STATES PATENT OFFICE.

ROBERT NICOL, JR., OF CHICAGO, ILLINOIS.

BICYCLE-CRANK AND PEDAL-SHIELD.

SPECIFICATION forming part of Letters Patent No. 551,597, dated December 17, 1895.

Application filed August 29, 1895. Serial No. 560,942. (No model.)

*To all whom it may concern:*

Be it known that I, ROBERT NICOL, Jr., a citizen of the United States, residing at Chicago, in the county of Cook and State of Illinois, have invented certain new and useful Improvements in Bicycle-Cranks and Pedal-Shields, of which the following is a specification.

The object of this invention is to prevent the foot of a bicycle-rider being caught in the frame of the machine, thereby obviating serious injury.

In the accompanying drawing I have shown a perspective view of the lower portion of a bicycle-frame to which my improvements have been applied.

In the construction of bicycles there is nothing to prevent the foot of the rider from being caught between the crank and the frame of the machine should it slip inward from the pedal or in mounting the wheel, and serious injuries often result.

In mounting a bicycle the foot of the rider is not always placed upon the pedal, as the pedal may not be in proper position to receive the foot, and in seeking to place the pedal in proper position the foot slips and enters between the crank and frame.

A disk 1 of sheet or cast metal is placed on the pedal-shaft 2 and is clamped in position between the end of the shaft and the outer face of the crank 3. The pedal 4 is mounted upon its shaft, and the disk does not interfere with the movements. The disk is of much larger dimensions than the end of the pedal. Should the rider in endeavoring to find the pedal move his foot inward beyond the inner end of the pedal it would come in contact with the disk and could be easily placed upon the pedal.

Great difficulty is experienced by beginners in riding the bicycle in keeping their feet upon the pedals and preventing their feet from moving inward beyond the crank; but with my improvements the rider will have no difficulty in locating the pedal, and when once located need have no fear of his foot being caught between the crank and frame of the bicycle, and the disk does not interfere with the removal of the feet from the pedals in case of accident or when wishing to dismount.

Instead of locating the disk in the manner shown it may be secured to the inner end of the pedal and move therewith.

I claim as my invention—

In a bicycle the combination of a crank and pedal of a shield located centrally of the pedal and at the inner end thereof preventing the foot of the rider from being caught between the crank and frame of the bicycle.

ROBERT NICOL, JR.

Witnesses:
    E. D. GREEN,
    PAUL FORWERG.